(12) United States Patent
Della Pietra et al.

(10) Patent No.: US 12,121,175 B2
(45) Date of Patent: Oct. 22, 2024

(54) ESPRESSO COFFEE MACHINE WITH ADJUSTMENT OF THE DISPENSING PRESSURE AND METHOD FOR ADJUSTING THE DISPENSING PRESSURE OF AN ESPRESSO COFFEE MACHINE

(71) Applicant: LA MARZOCCO S.R.L., Scarperia (IT)

(72) Inventors: Stefano Della Pietra, Scarperia (IT); Riccardo Gatti, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 744 days.

(21) Appl. No.: 17/289,093

(22) PCT Filed: Nov. 7, 2019

(86) PCT No.: PCT/EP2019/080559
§ 371 (c)(1),
(2) Date: Apr. 27, 2021

(87) PCT Pub. No.: WO2020/094794
PCT Pub. Date: May 14, 2020

(65) Prior Publication Data
US 2022/0007875 A1   Jan. 13, 2022

(30) Foreign Application Priority Data
Nov. 8, 2018   (IT) .................. 102018000010150

(51) Int. Cl.
*A47J 31/52*       (2006.01)
*A47J 31/00*       (2006.01)
(Continued)

(52) U.S. Cl.
CPC ......... *A47J 31/002* (2013.01); *A47J 31/0663* (2013.01); *A47J 31/303* (2013.01);
(Continued)

(58) Field of Classification Search
CPC ................ A47J 31/0663; A47J 31/0657; A47J 31/3671; A47J 31/30; A47J 31/32; A47J 31/34; A47J 31/5251; A47J 31/5255
See application file for complete search history.

(56) References Cited

U.S. PATENT DOCUMENTS

| | | | |
|---|---|---|---|
| 5,598,764 A | 2/1997 | Bambi | |
| 6,067,894 A | 5/2000 | Eugster | |

(Continued)

FOREIGN PATENT DOCUMENTS

| | | | |
|---|---|---|---|
| CN | 105877496 A | 8/2016 | |
| CN | 108024660 A | 5/2018 | |

(Continued)

OTHER PUBLICATIONS

Japanese Office Action dated May 30, 2023 issued in Japanese Patent Application No. 2021-523683 and English translation, 10 pp.

(Continued)

*Primary Examiner* — Reginald Alexander
(74) *Attorney, Agent, or Firm* — NIXON & VANDERHYE P.C.

(57) ABSTRACT

An espresso coffee machine comprising at least one dispensing group (1003) which dispenses shots of espresso coffee, a pressure sensor (24, 25) positioned at the dispensing group (1003), a measuring device and a control unit (30) is described. The pressure sensor (24, 25) provides values of the dispensing pressure (P1) in the dispensing group (1003). The measuring device provides values indicating the amounts of liquid at the inlet or the outlet of the dispensing group (1003). Using the values of the dispensing pressure (P1) received from the pressure sensor (24, 25) and the values indicative of the amount of liquid which are received from the measuring device, the control unit (30) controls the dispensing pressure (P1) of each shot according to a profile (Continued)

of the dispensing pressure (P1) as a function of the amount of liquid.

15 Claims, 9 Drawing Sheets

(51) Int. Cl.
*A47J 31/06* (2006.01)
*A47J 31/30* (2006.01)
*A47J 31/34* (2006.01)

(52) U.S. Cl.
CPC .......... *A47J 31/34* (2013.01); *A47J 31/5251* (2018.08); *A47J 31/5255* (2018.08)

(56) References Cited

U.S. PATENT DOCUMENTS

| | | | |
|---|---|---|---|
| 6,095,032 A | 8/2000 | Barnett | |
| 6,550,370 B2 | 4/2003 | Dam | |
| 8,505,441 B2 | 8/2013 | Bambi | |
| D780,500 S | 3/2017 | Bambi | |
| 10,537,206 B2 * | 1/2020 | Bezzera | A47J 31/5255 |
| 10,687,660 B2 | 6/2020 | Gatti | |
| 10,881,242 B2 | 1/2021 | Dionisio | |
| 11,103,104 B2 * | 8/2021 | Bakke | A47J 31/54 |
| 11,122,927 B2 | 9/2021 | Bianchi | |
| 11,503,947 B2 | 11/2022 | Della Pietra | |
| 11,517,142 B2 | 12/2022 | Gatti | |
| 11,517,143 B2 | 12/2022 | Dionisio | |
| 11,825,990 B2 | 11/2023 | Dionisio | |
| 2007/0193452 A1 | 8/2007 | Campetella et al. | |
| 2009/0095165 A1 | 4/2009 | Nosler | |
| 2010/0229728 A1 | 9/2010 | Kiefer et al. | |
| 2011/0094392 A1 | 4/2011 | Bianchi | |
| 2011/0117259 A1 | 5/2011 | Storek | |
| 2012/0266754 A1 | 10/2012 | Bambi | |
| 2014/0137746 A1 | 5/2014 | Moran | |
| 2014/0242226 A1 | 8/2014 | Büttiker | |
| 2016/0192809 A1 | 7/2016 | Bakke | |
| 2016/0249763 A1 | 9/2016 | Llopis | |
| 2016/0296065 A1 * | 10/2016 | Doglioni Majer | A47J 31/5253 |
| 2017/0119195 A1 | 5/2017 | Al-Shaibani | |
| 2017/0119202 A1 * | 5/2017 | Ottavi | A23F 5/26 |
| 2018/0055275 A1 | 3/2018 | Bianchi | |
| 2018/0192811 A1 | 7/2018 | Dionisio | |
| 2018/0228315 A1 | 8/2018 | Prefontaine et al. | |
| 2018/0303284 A1 | 10/2018 | Gatti | |
| 2018/0360257 A1 | 12/2018 | Dionisio | |
| 2019/0075964 A1 | 3/2019 | Della Pietra | |
| 2020/0093323 A1 | 3/2020 | Dionisio | |
| 2020/0138233 A1 | 5/2020 | Shalev | |
| 2020/0237137 A1 | 7/2020 | Bakke | |
| 2020/0367689 A1 * | 11/2020 | Illy | A47J 31/468 |
| 2021/0204748 A1 | 7/2021 | Della Pietra | |
| 2021/0315415 A1 | 10/2021 | Bianchi | |
| 2022/0007875 A1 | 1/2022 | Della Pietra | |
| 2022/0061586 A1 | 3/2022 | Guglielmino | |
| 2022/0095839 A1 | 3/2022 | Dionisio | |
| 2022/0117442 A1 | 4/2022 | Dionisio | |
| 2022/0192419 A1 * | 6/2022 | Duvall | A47J 31/5251 |
| 2023/0284819 A1 | 9/2023 | Dionisio | |
| 2023/0284823 A1 | 9/2023 | Wurm | |
| 2023/0284831 A1 | 9/2023 | Dionisio | |
| 2023/0284834 A1 | 9/2023 | Dionisio | |
| 2024/0032726 A1 | 2/2024 | Moran | |

FOREIGN PATENT DOCUMENTS

| | | |
|---|---|---|
| EP | 2 490 580 | 8/2012 |
| EP | 2 701 563 | 3/2014 |
| EP | 2 789 276 | 10/2014 |
| EP | 3 064 099 | 9/2016 |
| RU | 2 680 420 | 8/2010 |
| WO | WO 2010/085850 | 8/2010 |
| WO | WO 2012138327 | 10/2012 |
| WO | WO 2012146641 | 11/2012 |
| WO | WO 2014/028844 | 2/2014 |
| WO | WO 2015006244 | 1/2015 |
| WO | WO 2015/055343 | 4/2015 |
| WO | WO 2015055342 | 4/2015 |
| WO | 2017/068021 | 4/2017 |

OTHER PUBLICATIONS

Russian Search Report dated Mar. 6, 2023 issued in Russian Patent Application No. 2021115613 and English translation, 8 pp.
Blake, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
International Search Report and Written Opinion mailed Jun. 15, 2015, issued in corresponding International Application No. PCT/IB2015/051903, filed Mar. 16, 2015, 10 pages.
Paul, "Weighing Espresso—How It Works," Nov. 16, 2010, Blog, Marco Beverage Systems U.S., Seattle, Wash., <http://marcobeveragesystems.com/us/weighing-espresso-how-it-works/> [retrieved Jun. 3, 2015], 1 page.
CN Office Action and English translation thereof mailed Aug. 31, 2022 in CN Patent Application 201980070969.7.
International Search Report for PCT/EP2019/080559, mailed Feb. 11, 2020, 5 pages.
Written Opinion of the ISA for PCT/EP2019/080559, mailed Feb. 11, 2020, 5 pages.

* cited by examiner

ESPRESSO COFFEE MACHINE WITH ADJUSTMENT OF THE DISPENSING PRESSURE AND METHOD FOR ADJUSTING THE DISPENSING PRESSURE OF AN ESPRESSO COFFEE MACHINE

This application is the U.S. national phase of International Application No. PCT/EP2019/080559 filed 7 Nov. 2019, which designated the U.S. and claims priority to IT Patent Applications No. 102018000010150 filed 8 Nov. 2018, the entire contents of each of which are hereby incorporated by reference.

FIELD OF THE INVENTION

The present invention relates in general to the sector of machines for the preparation of beverages. More particularly, it relates to a machine for espresso coffee (or other beverages) provided with a system for adjusting the dispensing pressure during preparation of the beverage. The present invention also relates to a method for adjusting the dispensing pressure of an espresso coffee machine.

PRIOR ART

As is known, a coffee may be obtained by means of an infusion or percolation process. In the percolation process liquid passes through a porous body. Percolation makes use of a dynamic process where the liquid passes through a porous baffle, while infusion is based on a static process. Espresso coffee represents a system for performing extraction by means of forced percolation following an increase in the pressure of the water.

EP 2,490,580 relates to a machine for the preparation of coffee or the like. The machine comprises one or more operating groups, each of which comprises at least one boiler, a pump, a heating unit, and a unit for extracting aromas and dispensing espresso coffee with the associated ducts. Each group is provided with a system for controlling and adjusting parameters for production of the espresso coffee. According to one embodiment, the machine comprises means for modulating the extraction pressure of the espresso coffee infusion. According to one embodiment, the machine comprises means for adjusting the extraction temperature of the espresso coffee infusion. According to one embodiment, the machine comprises a control unit which contains various stored pressure profiles which can be called up by the operator.

EP 2,701,563 relates to a weighing device for an espresso coffee machine and an espresso coffee machine which incorporates such a device.

EP 3,064,099 discloses a machine for coffee-based beverages.

SUMMARY OF THE INVENTION

In the machine described in EP 2,490,580 a puck of coffee powder may be passed through by water at a predetermined pressure. The predetermined pressure may be constant over time, but typically varies over time according to a given profile. In turn, the profile of the dispensing pressure as a function of the time may be chosen from a plurality of pressure profiles which are stored (either at the factory or by the machine user).

The solution according to EP 2,490,580 is very advantageous since it allows different pressures to be applied depending, for example, on the coffee mixture used, the ground particle size, the degree of compaction of the coffee puck or other factors. As is known, the dispensing pressure influences the organoleptic properties.

Therefore, by applying the teachings disclosed in EP 2,490,580, it is possible to generate a pressure profile over time during which the machine will cause pressurized water to pass through the coffee puck.

However, the Applicant has noted that, when using pressure/time profiles, control over the amount of fluid which passes through the puck is neglected. In a similar manner to the variation of the pressure over time, the amount of water (as opposed to the amount of coffee powder) also influences the organoleptic properties of the espresso coffee.

Therefore, the Applicant considers that the present state of the art does not allow the same organoleptic characteristics of the infusion (espresso coffee) to be reproduced because the ratio existing between the pressure and the solute/solvent ratio which form it is not taken into account.

The aim of the Applicant is to provide a machine for espresso coffee (or other beverages) which is able to prepare an espresso coffee using parameters set by a user. The main aim of the new machine is to allow (typically the bartender) to generate and/or reproduce pressure profiles strictly related to the variation in the mass or volume of fluid used.

According to the present invention, an espresso coffee machine which is able to correlate, also in a continuous manner, a mass/volume to a given pressure is provided.

In this way, the user is able to vary in a definite manner the amount of mass/volume extracted at different pressures, being therefore able to optimize in a precise and repeatable manner the organoleptic properties of the coffee puck selected by the user.

According to a first aspect, the present invention provides an espresso coffee machine comprising at least one dispensing group suitable for dispensing a shot of espresso coffee, the at least one dispensing group being configured to removably engage a portafilter (filter holder), said machine comprising:
  a pressure sensor positioned at the dispensing group and suitable for supplying values of a dispensing pressure in the dispensing group
  a measuring device suitable for providing values indicative of an amount of liquid at the inlet or outlet of said dispensing group; and
  a control unit configured to receive said values of said dispensing pressure from said pressure sensor and said values indicative of said amount of liquid from said measuring device,
  wherein said control unit is configured to control, using said values of said dispensing pressure received from said pressure sensor and said values indicative of said amount of liquid received from said measuring device, said dispensing pressure according to a profile of dispensing pressure as a function of said amount of liquid.

Preferably, according to the present invention, there is provided a continuous control of pressure Vs. amount of beverage, not a discrete control.

According to first embodiments, the values indicative of an amount of liquid at the inlet or the outlet of the dispensing group comprise values related to or corresponding to a mass of liquid at the inlet or the outlet of the dispensing group.

According to a variant of these embodiments, the measuring device comprises a weighing device configured to measure a mass of liquid at the outlet of the dispensing group and the values indicative of an amount of liquid at the inlet or the outlet of the dispensing group comprise values of a mass of liquid at the outlet of the dispensing group.

According to other embodiments, the values indicative of an amount of liquid at the inlet or the outlet of the dispensing group comprise values related to or corresponding to a volume of liquid at the inlet or the outlet of the dispensing group.

According to a variant of these embodiments, the measuring device comprises a flowmeter configured to measure a volume of liquid at the inlet of the dispensing group and the values indicative of an amount of liquid at the inlet or the outlet of the dispensing group comprise values of a volume of liquid at the inlet of the dispensing group.

Preferably, the control unit, given a total amount of liquid to be supplied to the inlet or the outlet of the dispensing group during a dispensing cycle, is configured to:
  subdivide the total amount of liquid into N portions; and
  during dispensing of each of the N portions, keep the dispensing pressure at a respective substantially constant value, the respective substantially constant value being determined on the basis of the profile of dispensing pressure as a function of the amount of liquid.

Preferably, the control unit, during the dispensing cycle, is configured to:
  periodically obtain the indicative values of the amount of liquid from the measuring device; and
  when, on the basis of the periodically obtained values indicative of the amount of liquid, it determines that the dispensing of one of the N portions has terminated, adjust the dispensing pressure from the respective substantially constant value to a further substantially constant value associated with the next portion.

Preferably, the control unit is configured to:
  periodically obtain the dispensing pressure values from the pressure sensor; and
  by means of a feedback mechanism, adjust the flowrate of the water supplied to the dispensing group so as to keep the dispensing pressure at the substantially constant value.

Preferably, the control unit is provided with a memory suitable for memorizing the profile of dispensing pressure as a function of the amount of liquid.

Preferably, the machine comprises data entry means for loading into the memory the profile of dispensing pressure as a function of the amount of liquid.

According to a variant, the memory stores the profile in the form of a discrete set of N samples, N being greater than or equal to 2, each sample comprising a respective sample of liquid amount and a respective pressure value associated therewith according to the profile of dispensing pressure as a function of the amount of liquid.

According to a second aspect, the present invention provides a method for adjusting the dispensing pressure of an espresso coffee machine comprising at least one dispensing group suitable for dispensing a shot of espresso coffee, the at least one dispensing group being configured to removably engage a portafilter (filter holder), the method comprising:
  measuring values of a dispensing pressure at the dispensing group;
  measuring values indicative of an amount of liquid at the inlet or outlet of the dispensing group; and
  using the values of the dispensing pressure and the values indicative of the amount of liquid, controlling the dispensing pressure according to a profile of dispensing pressure as a function of the amount of liquid.

BRIEF DESCRIPTION OF THE DRAWINGS

The present invention will become completely clear from the following detailed description, provided by way of a non-limiting example, to be read with reference to the attached drawings in which.

DETAILED DESCRIPTION

The description below, for the sake of convenience, refers in particular to an espresso coffee machine, but the present invention is not limited to such machines and is applicable to machines for dispensing other beverages. For example, barley powder or other cereal powder may be used instead of coffee powder. Therefore, the expression "espresso coffee machine" must be understood as comprising also machines for preparing other beverages, provided this operation is performed by means of forced percolation (using pressurized water). Similarly, the expression "espresso coffee" must be understood as having a wider meaning corresponding to the product (coffee, barley or other cereal) used for preparation of the beverage, again by means of forced percolation (using pressurized water).

The machine to which the present invention relates may also be a machine of the lever or piston type. By way of a further alternative, the present invention may also be applied to a machine of the modular type, for example of the type described in EP 2,789,276.

Figure 1:
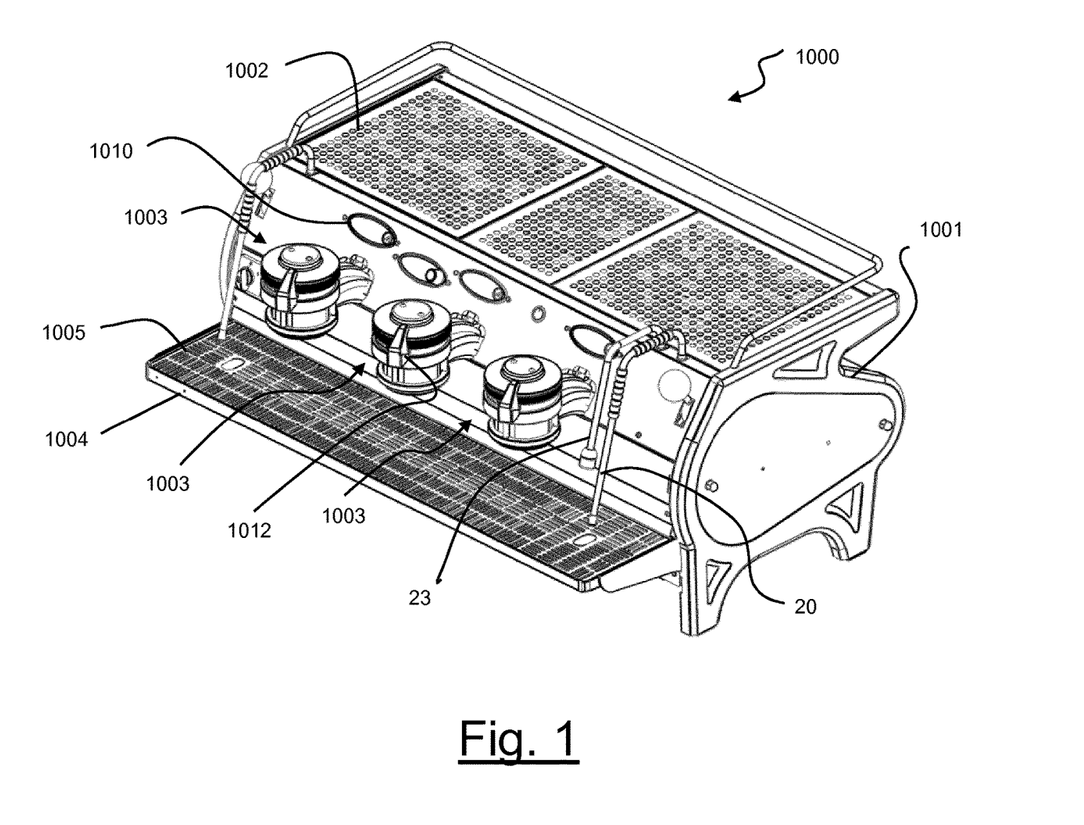
FIG. 1 is an axonometric view of an example of an espresso coffee machine in which the present invention may be incorporated.

FIG. 1 shows, purely by way of example, an espresso coffee machine denoted overall by the reference number 1000. The machine 1000 comprises a substantially closed machine body 1001 which houses inside it the main components of the machine, some of which will be described below. At the top, preferably, the machine 1000 comprises a surface 1002 on which the cups may be placed. An electrical resistance (not shown) or other heating system for heating the cups on the surface 1002 may also be provided.

The machine 1000 comprises at least one dispensing group 1003 for dispensing espresso coffee. Preferably, the machine 1000 comprises several dispensing groups 1003, for example three groups, like the machine shown by way of example in FIG. 1. There could also be two, four or more such groups. A drip tray 1004, which is preferably partially closed at the top by a grille 1005, is present underneath the dispensing groups 1003. Typically the coffee cups are placed on the grille 1005 during dispensing of the espresso coffee.

A portafilter for supporting a filter basket for a coffee powder puck may be removably connected to each dispensing group 1003.

The machine 1000 may comprise one or more displays 1010 and pushbuttons, for example for switching on/off the machine and/or for starting/ending dispensing.

The machine 1000 shown in FIG. 1 also comprises, for each dispensing group 1003, a lever 1112 for starting/ending dispensing of the espresso coffee and/or for modifying the dispensing pressure during dispensing of the espresso coffee.

Before describing in detail the hydraulic diagram shown in FIGS. 2 and 3, the various reference numbers used, together with a short description of the single components, are shown below.

1 COFFEE BOILER
10 PUMP
11 EXPANSION VALVE
12 CHECK VALVE
13 PRE-HEATER MIXING VALVE
14 STEAM BOILER
15 DECOMPRESSION VALVE
16 FLOWMETER (VOLUMETRIC METER)
18 BALL TAP
19 STEAM ELECTROVALVE
20 STEAM WAND
21 HOT WATER MIXING VALVE
22 STEAM BOILER FILLING ELECTROVALVE
23 HOT WATER WAND
24 PRESSURE SENSOR
25 STEAM BOILER PRESSURE GAUGE
26 DRAINAGE WELL
27 GEAR PUMP
28 SAFETY VALVE
29 WEIGHING DEVICE

Preferably, the flowmeter 16 is positioned along the hydraulic circuit which connects the pump 10 to the dispensing group 1003, so as to provide a measurement of the volume of water supplied to the dispensing group 1003.

Preferably, the pressure sensor 24 is positioned at the dispensing group 1003 so as to provide a measurement of the pressure of dispensing of the beverage by the dispensing group 1003.

Preferably, the weighing device 29 is positioned underneath the dispensing group 1003 so as to provide a measurement of the weight or mass of the liquid dispensed by the dispensing group 1003. For this purpose, the weighing device 29 preferably comprises a weighing platform suitable for supporting a cup or a receptacle intended to collect the liquid dispensed by the dispensing group 1003. The weighing device 29 also comprises a load cell cooperating with the weighing platform and designed to measure the weight of the liquid dispensed into the cup or receptacle supported by the weighing platform. The load cell may be situated directly underneath the weighing platform (as schematically shown in FIG. 3) or may be connected directly thereto by means of a mechanical connection comprising one or more arms and/or brackets.

In order to allow positioning of the weighing device 29 underneath the dispensing group 1003, the grille 1005 preferably has an opening with a form corresponding to that of the weighing platform (typically rectangular). The weighing platform is preferably positioned underneath the dispensing group 1003 so as to be aligned with the grille 1005. If the load cell is situated directly underneath the weighing platform, in this way the entire weighing device 29 is substantially positioned inside the drip tray 1004. Alternatively, the aforementioned mechanical connection between weighing platform and load cell may allow positioning of the weighing platform alone inside the drip tray 1004, while the load cell may be positioned in a different position, for example inside the machine body 1001.

Figure 2:
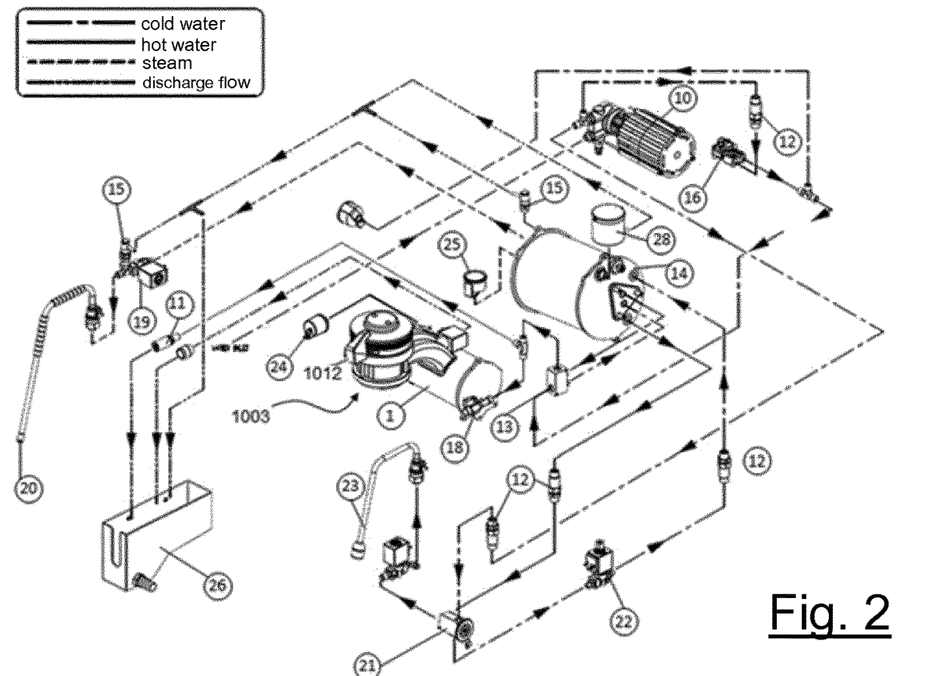
FIG. 2 is a first embodiment of a hydraulic circuit diagram of an espresso coffee machine according to the present invention.
Figure 3:
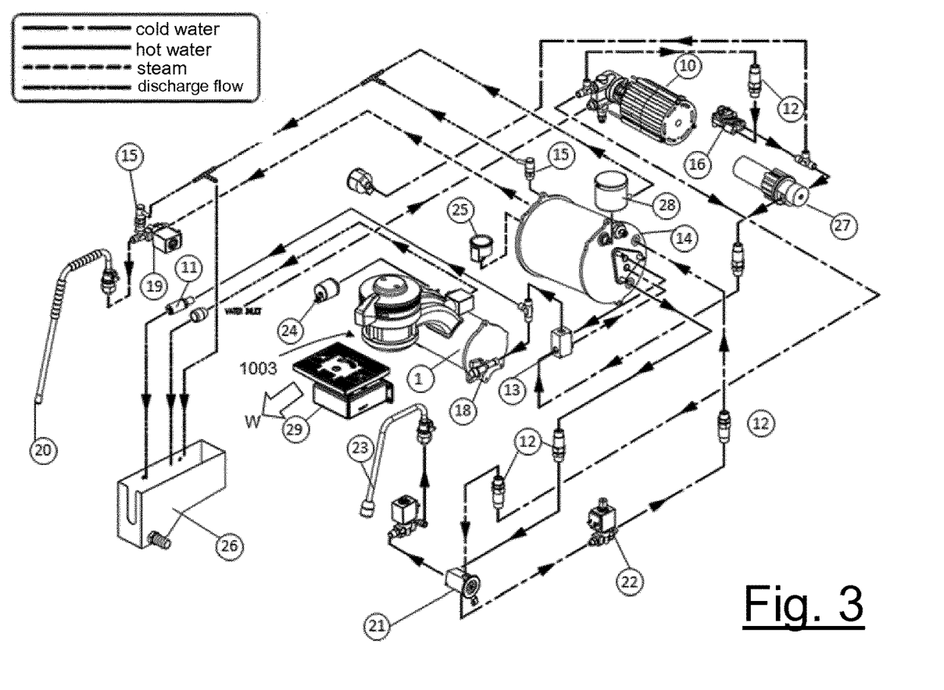
FIG. 3 is a second embodiment of a hydraulic circuit diagram of an espresso coffee machine according to the present invention.

FIGS. 2 and 3 use a symbol system where the cold water flow is indicated graphically by a "long dash-single short dash-long dash" line; the hot water flow is indicated graphically by a continuous line, the steam flow is indicated graphically by a broken line and, finally, the discharge water flow is indicated graphically by a "long dash-short double dash-long dash" line.

Briefly, in the exemplary diagram shown in FIG. 2, the cold water from the mains (or from any other source) is supplied to the pump 10. The pump 10 supplies the water to the steam boiler 14, preferably passing through the check valve 12 and the preheater mixing valve 13.

Preferably, the steam wand 20 is connected to the steam boiler 14 so as to dispense steam in order, for example, to foam the milk for making a cappuccino.

Preferably, the steam boiler 14 is connected via a fluid line to the hot water wand 23 in order to supply hot water for preparing infusions (tea or tisanes, for example).

Figure 4:
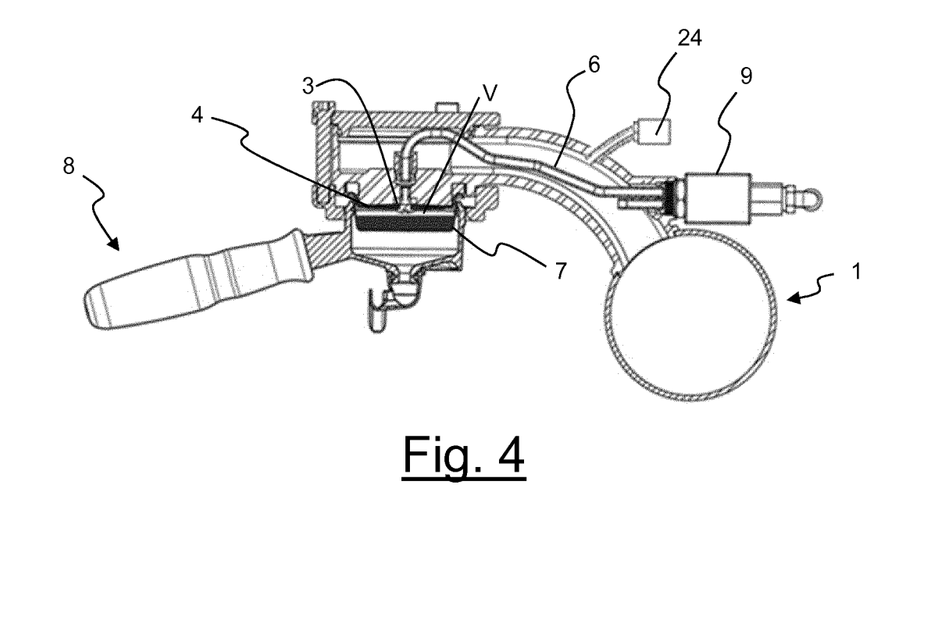
FIG. 4 is a cross-sectional view of the coffee boiler, the dispensing group and the portafilter.

Preferably, as shown in FIG. 4, the water from the coffee boiler 1 is conveyed to the dispensing group 1003 via an infusion electrovalve 9 and an infusion water pipe 6. In particular, the water from the pipe 6 preferably reaches a shower screen 4 by means of which it is distributed substantially uniformly over a puck of coffee powder contained inside a filter basket 7 supported by the filter holder 8. The puck of coffee powder comprises ground coffee which has been pressed by the bartender before the portafilter is engaged with the bottom part of the dispensing group 1003.

Preferably, the infusion electrovalve 9 is a three-way valve. The infusion electrovalve 9 comprises a first path for drawing infusion water from the coffee boiler 1, a second path connected to the pipe 6 for dispensing infusion water and a third path for connecting the infusion zone to the discharge outlet.

The infusion water dispensing pipe 6 is preferably in fluid communication with a diffuser screw 3 and with the shower screen 4.

During use, when a user wishes to prepare an espresso coffee, he/she presses a button (or starts the extraction process in some other way). The infusion water is drawn via the take-off pipe of the infusion electrovalve 9 of the coffee boiler 1 and is directed towards the coffee puck via the pipe 6 for supplying the infusion water. The pressurized water starts to flow into the infusion water supply pipe 6 until the latter is completely filled. Then, the pressurized hot water flows into the empty space above the coffee puck.

The expression "empty space above the coffee powder puck" (or similar expressions) is understood as meaning in the present description and in the claims a space (or volume) which, before preparation of an espresso coffee is started, is not filled with water and is bounded at the bottom by the puck of coffee powder and at the top by the coffee boiler. Typically this empty space comprises a pre-infusion chamber, an infusion electrovalve and a pipe for supplying infusion water. The term "pre-infusion chamber" is understood as meaning a chamber bounded at the bottom by the upper surface of the coffee puck, laterally by the upper portion of the side wall of the filter basket which contains the coffee puck and, at the top, by the bottom surface of the dispensing group. Below this empty space will be indicated by the letter "V".

The espresso coffee machine according to the present invention is able to dispense coffee at a pressure which is a function of a value of a measured amount of liquid. The value of the amount of liquid may be a value related (or corresponding) to a volume of liquid or a mass of liquid. For example, it may have a water volume value (which may be measured or estimated by means of a volumetric meter). Typically, the water may be that output by the infusion electrovalve 9 or that of the beverage collected inside the cup or inside any other container. Alternatively, it may be a value of the mass (or weight) of the beverage collected inside the cup or inside any other container.

For this purpose, the espresso coffee machine 1000 is preferably provided with a control unit (not shown in FIGS. 1 and 2).

Figure 5:
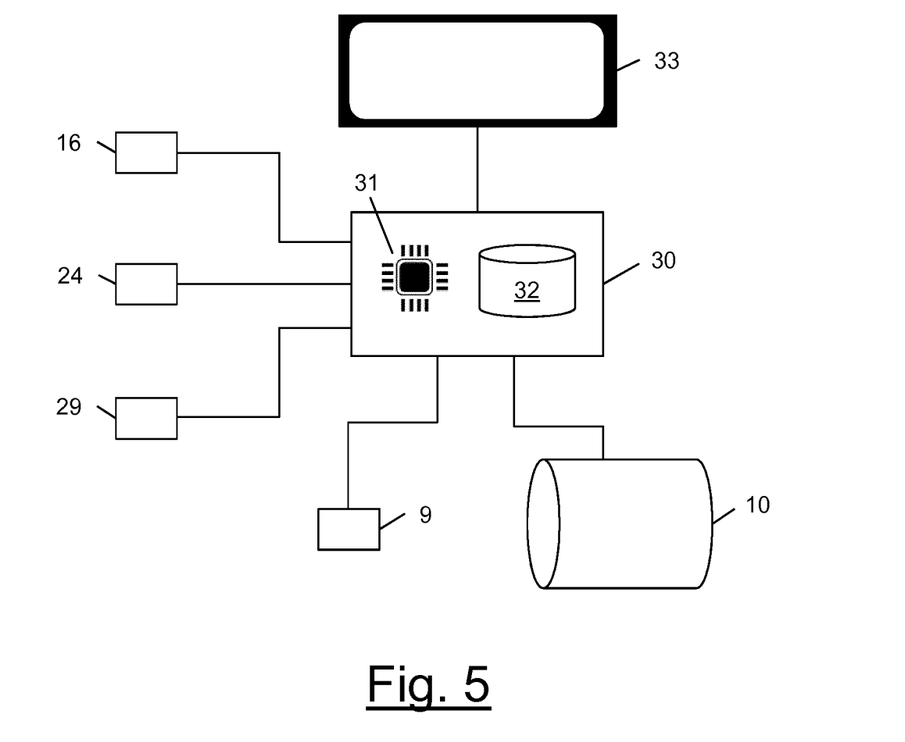
FIG. 5 is a block diagram which shows the electrical connections present between some components of the espresso coffee machine according to embodiments of the present invention.

As schematically shown in FIG. 5, the control unit (indicated by the reference number 30) preferably comprises a processor 31 and a memory 32 inside which a pressure control software suitable for execution by the processor 31 is stored.

The control unit 30 is preferably connected electrically to the pressure sensor 24 and to at least either one of the flowmeter 16 and the weighing device 29. The control unit 30 is preferably also connected electrically to the electrovalve 9a and/or to the pump 10.

The espresso coffee machine 1000 preferably also comprises a user interface 33, for example a display with pushbuttons or a touchscreen, also connected to the control unit 30.

The electrical connections between the control unit 30 and the flowmeter 16, the pressure sensor 24, the weighing device 29, the electrovalve 9, the pump 10 and the user interface 33 are preferably cabled connections. Alternatively, one or more of these connections may be of the wireless type. For example, one or more connections of the wireless type may be formed using Bluetooth technology.

Preferably, the control unit 30 is programmed to adjust the dispensing pressure during each dispensing cycle so that said pressure follows:
 (i) a predetermined pressure profile depending on the mass of liquid dispensed inside the cup as measured by the weighing device 29 (first operating mode) or
 (ii) a predetermined pressure profile depending on the volume of water dispensed to the water dispenser as measured by the flowmeter 16 (second operating mode).

With reference to the first operating mode, FIGS. 6a-6d show four examples of profiles of the pressure as a function of the mass of liquid dispensed inside the cup. In the graphs, the mass values shown are standardized with respect to the total mass dispensed.

Figure 6A:
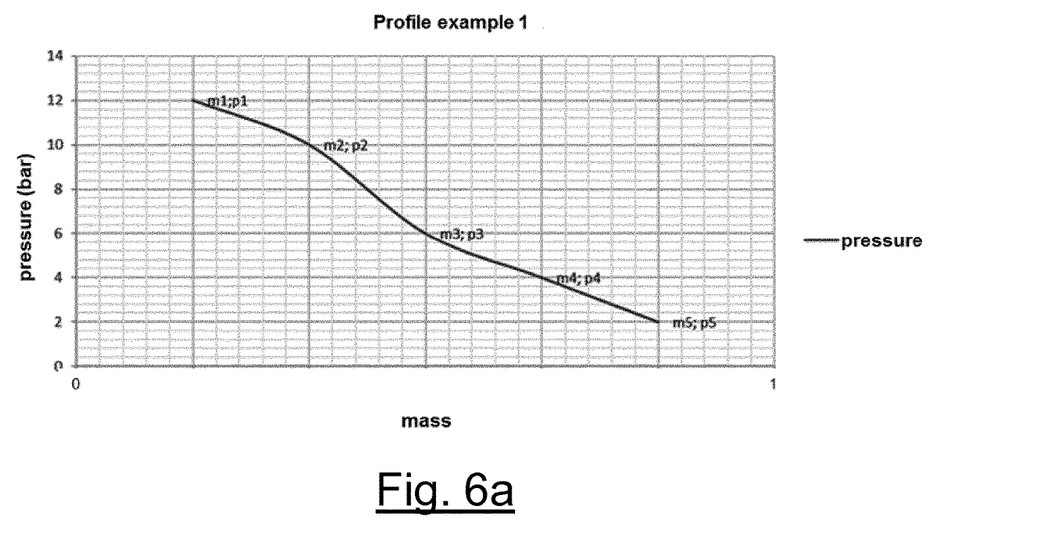
FIGS. 6a-6d show examples of pressure profiles as a function of the mass of liquid dispensed inside the cup.
Figure 6B:
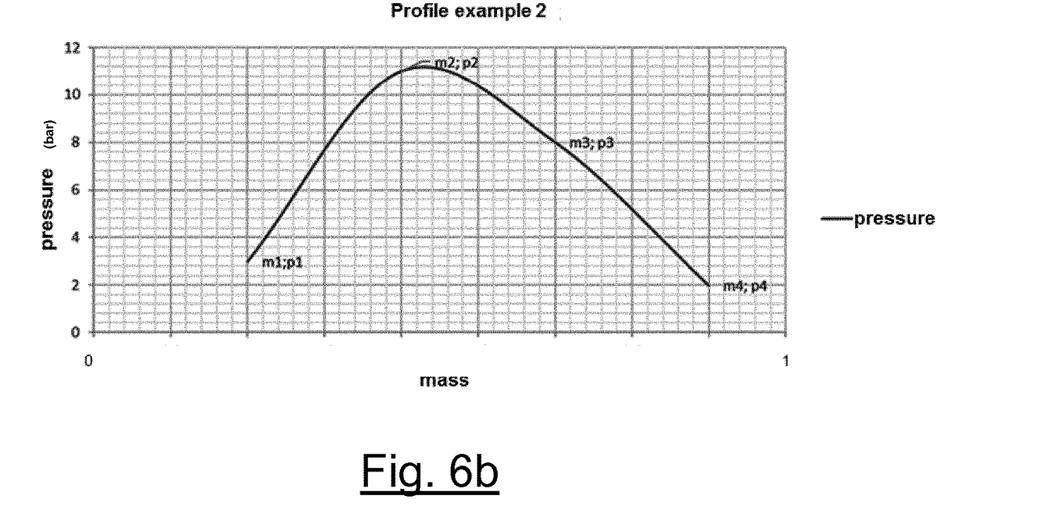
Figure 6C:
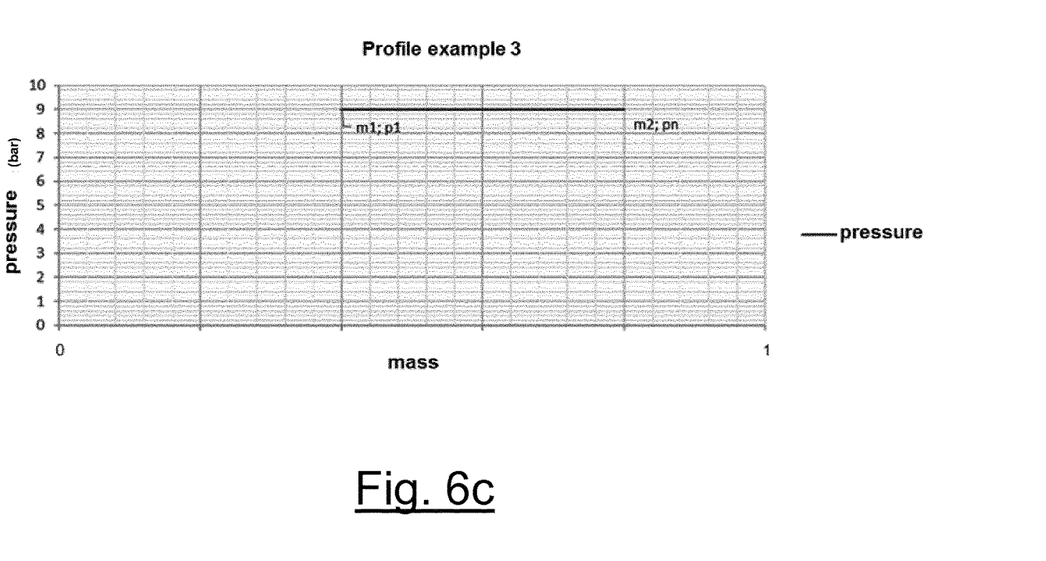
Figure 6D:
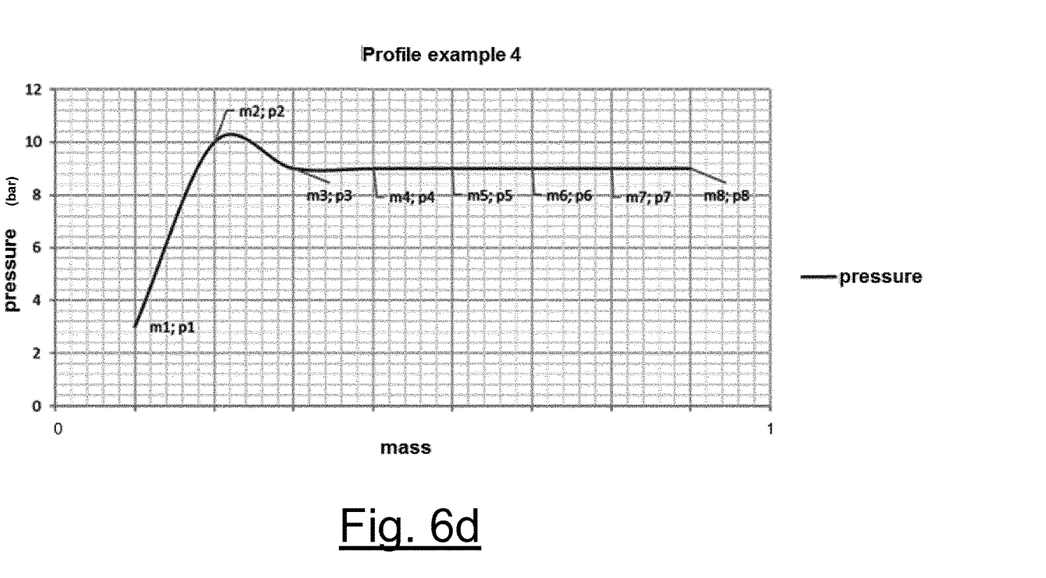

According to the first example of the profile shown in FIG. 6a, the pressure decreases with an increase in the mass. According to the second example of the profile shown in FIG. 6b, the pressure initially increases with an increase in the mass and, once the maximum value has been reached, it starts to decrease again. According to the third example of the profile shown in FIG. 6c, the pressure is substantially constant upon variation of the mass. According to the fourth example of the profile shown in FIG. 6d, the pressure initially increases with an increase in the mass and, once a maximum value has been reached, decreases slightly until it settles at a substantially constant value. These different pressure profiles give rise to beverages with different characteristics. The bartender may decide, depending on his/her experience and sensitivity, which pressure profile is most suitable in the specific case.

In order to allow the control unit 30 to adjust automatically the dispensing pressure during each dispensing cycle according to any desired pressure profile (for example one of the profiles shown by way of example in FIGS. 6a-6b), preferably the pressure profile to be reproduced is sampled, identifying therein a discrete set of N mass samples m1, m2, . . . mN (where N is greater than or equal to 2). The sampling frequency (and therefore the number N of samples) is chosen so as not to undersample the profile to be reproduced. The more complex the profile, therefore, the greater will be the sampling frequency and the number N of samples. For example, in the case of the constant profile shown in FIG. 6c, N=2 samples are sufficient, while in the case of a complex profile such as that shown in FIG. 6d N=8 samples are necessary. In the case of the profiles shown in FIGS. 6a and 6b, which are of a middling complexity, N may be equal to 4 or 5, depending on the accuracy with which the pressure profile is to be reproduced.

In the desired profile a respective pressure value p1, p2, . . . pN corresponds to each sample m1, m2, . . . mN.

The pairs (m1; p1), (m2; p2), . . . (mN; pN) are preferably loaded into the processing unit 30, for example into its memory 32. This loading operation may be performed for example via a data input/output interface present in the machine 1000 (for example a USB port). The data loading operation may therefore be performed by the user of the machine 1000 by inserting into the USB port of the machine 1000 a USB key with the pairs (m1; p1), (m2; p2), . . . (mN; pN) stored on it. The operation of transferring the pairs (m1; p1), (m2; p2), . . . (mN; pN) from the USB key to the memory 32 may therefore be performed automatically or may be managed by the user by means of a special function for managing the pressure profiles implemented by the user interface 33.

Alternatively, the aforementioned loading operation may be performed in another way, for example:
 dispensing a sample shot with a desired pressure profile manually controlled by the bartender. According to these operating mode, the pressure profile used by the bartender to dispense the sample shot is stored by the processing unit 30 so as to be able to be reproduced automatically during the subsequent dispensing operations;
 storing the pressure profile directly on the machine (for example by indicating specifically the desired values of the pairs (m1; p1), (m2; p2), . . . (mN; pN) by means of as special function implemented via the user interface; or
 storing the pressure profile by means of a smartphone and/or tablet app (for example indicating specifically the desired values of the pairs m1; p1), (m2; p2), . . . (mN; pN)). The app may then send the profile to the espresso coffee machine, for example wirelessly.

It is assumed that the bartender wishes to perform a dispensing cycle using the pressure profile corresponding to the pairs (m1; p1), (m2; p2), . . . (mN; pN), and that, at the end of the dispensing cycle, he/she wishes to obtain a certain total mass Mtot of liquid dispensed in the cup. The selection of the profile may be performed for example by means of a special function for selecting the pressure profiles which is implemented via the user interface 33. The selection of the total mass Mtot may also be performed via the user interface 33.

Once the selection of the total mass Mtot and pressure profile has been received by the bartender, the control unit 30 preferably rescales the values of the samples m1, m2, . . . mN corresponding to the profile selected on the basis of the desired total mass Mtot. In particular, the control unit 30 preferably multiples all the values of the samples m1, m2, . . . mN by the same scale factor equal to Mtot/mN, thus obtaining N mass values M1, M2, . . . MN. In this way, the last mass value MN is equal to the desired total mass Mtot.

Figure 7:
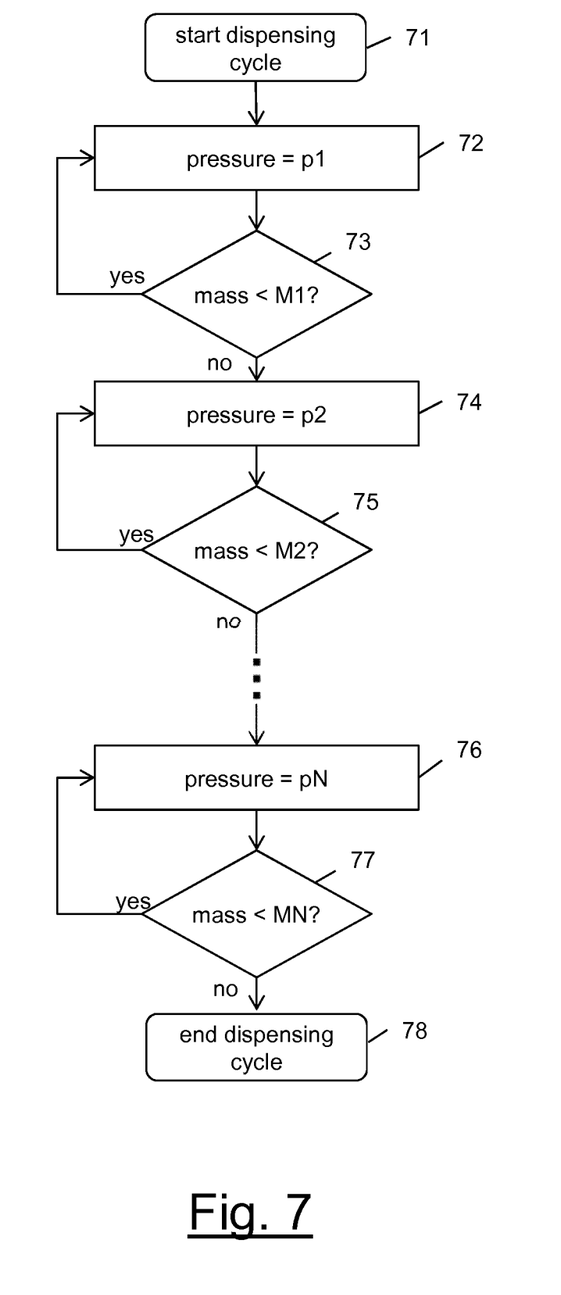
FIG. 7 is a flow diagram of operation of the espresso coffee machine according to a first operating mode.

With reference now to the flow diagram in FIG. 7, once the dispensing cycle has started (step 71), the control unit 30 preferably controls dispensing so that the dispensing pressure is equal to the pressure value p1 corresponding to the first mass value M1 (step 72). For this purpose, the control unit 30 preferably receives periodically (for example every 0.1 s) the value of the liquid mass dispensed inside the cup as measured by the weighing device 29.

At the same time, the control unit 30 receives periodically also the value of the dispensing pressure measured by the pressure sensor 24. In particular, the control unit 30 preferably requests the pressure sensor 24 to detect the dispensing pressure and to supply it with said pressure value whenever there is an increase in the dispensed mass by a certain amount, for example 0.5 g. Then, by means of a feedback mechanism, the control unit 30 preferably adjusts the flowrate of the water supplied to the dispensing group (for example by regulating the electrovalve 9 or directly the flowrate of the pump 10) so as to keep the dispensing pressure at the pressure value p1.

For as long as, on the basis of the mass values received, the control unit 30 determines that the mass of the liquid dispensed inside the cup is less than the first mass value M1 (step 73), the control unit 30 preferably keeps the dispensing pressure at the pressure value p1.

When instead it determines that the mass of the liquid dispensed inside the cup has reached the first mass value M1, the control unit 30 preferably controls the dispensing so as to adjust the dispensing pressure from the pressure value p1 to the pressure value p2 corresponding to the second mass value M2 (step 74). In this case also, the control unit 30 preferably acts in such a way that the dispensing pressure passes from p1 to p2 and remains always equal to this latter value using a feedback mechanism similar to that described above.

For as long as, on the basis of the mass values received from the weighing device 29, the control unit 30 determines that the mass of the liquid dispensed inside the cup is less than the second mass value M2 (step 75), the control unit 30 preferably keeps the dispensing pressure at the pressure value p2.

The operation of the control unit 30 is repeated cyclically until the control unit 30 adjusts the dispensing pressure to the pressure value pN corresponding to the last mass value MN (step 76). The control unit 30 preferably keeps the dispensing pressure at the pressure value pN until, on the basis of the mass values received from the weighing device 29, it determines that the mass of the liquid dispensed inside the cup has reached the last mass value MN (step 77) which, as mentioned above, is equal to the desired total mass Mtot.

When Mtot is reached, the control unit 30 then automatically ends the dispensing cycle (step 78).

At the end of the dispensing cycle, therefore, the bartender has obtained the desired liquid mass Mtot as the sum of the masses M1, M2, . . . MN, each of which was dispensed with the respective dispensing pressure p1, p2, . . . pN determined on the basis of the desired pressure profile.

If the bartender wishes to vary the total mass Mtot, this variation will result in rescaling of the values of the samples m1, m2, . . . mN according to a different scale factor, something which will advantageously allow, by means of execution of the algorithm according to FIG. 7, the same pressure profile to be reproduced and, at the end of the dispensing cycle, a new desired total mass value Mtot to be obtained. In this way, a high degree of reproducibility of the dispensing parameters is obtained, something which, in combination with the possibility of choosing the desired pressure profile, allows the bartender to obtain in a precise and repeatable manner beverages with the desired organoleptic properties.

As mentioned above, according to a second operating mode, the control unit 30 is programmed to regulate the dispensing pressure during each dispensing cycle, so that said pressure follows a predetermined pressure profile depending on the volume of water supplied to the dispensing group as measured by the flowmeter 16.

Figure 8A:
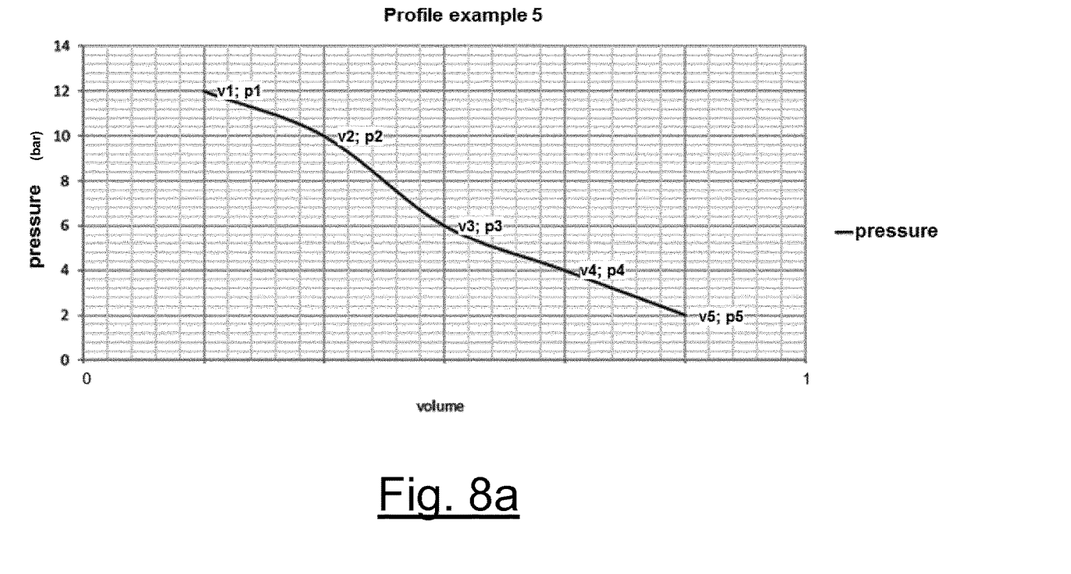
FIGS. 8a-8d show examples of pressure profiles as a function of the volume of liquid dispensed.
Figure 8B:
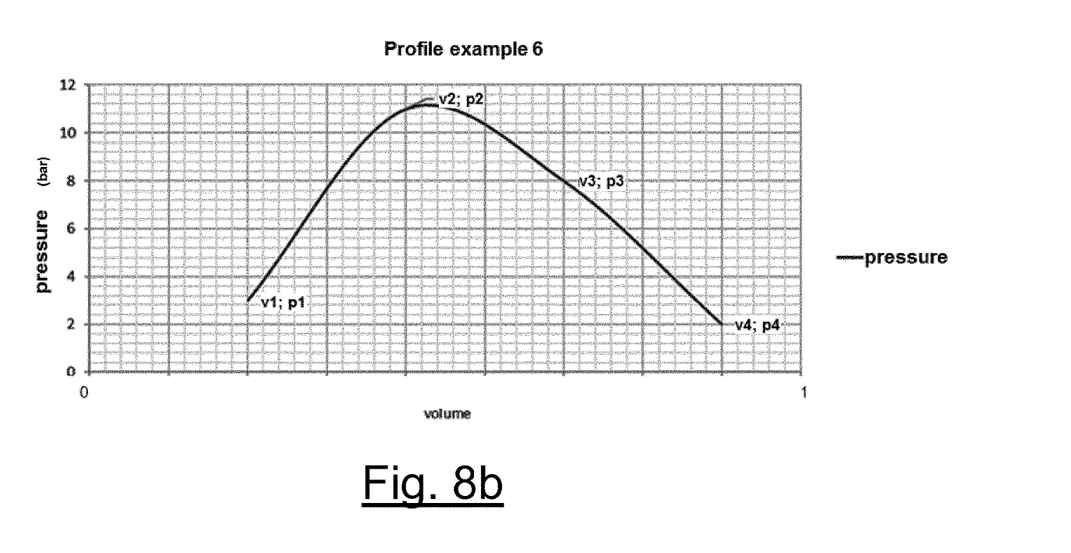
Figure 8C:
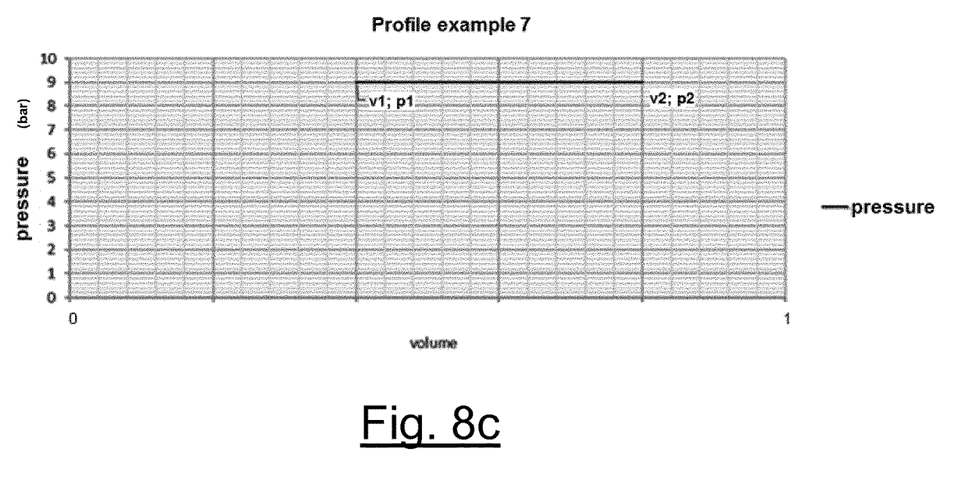
Figure 8D:
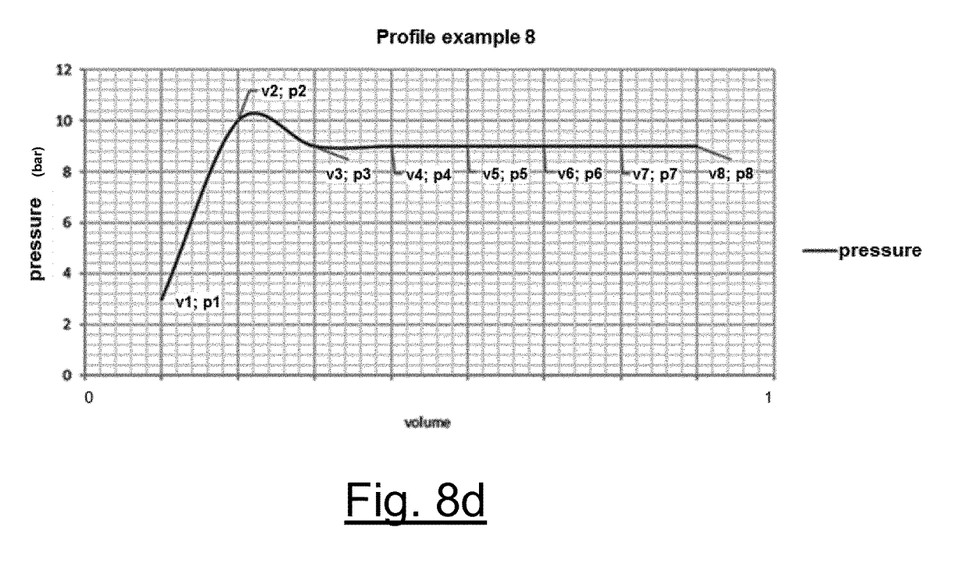

In this case it is possible to use for example pressure profiles depending on the volume which are similar to those shown in FIGS. 6a-6d, namely a decreasing profile (FIG. 8a), an initially increasing and then decreasing profile (FIG. 8b), a constant profile (FIG. 8c) or a profile with a more complex progression (FIG. 8d). In this case also, it will be the bartender who chooses which one to use depending on his/her own experience and sensitivity.

In this case also, in order to allow the control unit 30 to adjust automatically the dispensing pressure during each dispensing cycle according to any desired pressure profile (for example one of the profiles shown by way of example in FIGS. 8a-8b), preferably the pressure profile to be reproduced is sampled, identifying therein a discrete set of N volume samples (m1, m2, . . . mN, to which respective pressure values p1, p2, . . . pN correspond. In this case also, the number N of samples is chosen so as not to undersample the profile to be reproduced, and therefore depends on the complexity of the profile and the accuracy with which it is to be reproduced.

The operation of loading the pairs (v1; p1), (v2; p2), . . . (vN; pN) into the processing unit 30 may be performed as described above in connection with the first operating mode. However, according to this second operating mode, the bartender selects the total volume Vtot to be dispensed, and not the total mass Mtot. The selection of the total volume Vtot may also be performed via the user interface 33.

Once the selection of the total volume Vtot and pressure profile by the bartender has been received, the control unit 30 preferably rescales the values of the samples v1, v2 . . . vN corresponding to the selected profile, multiplying them all by a same scale factor equal to Vtot/Vn, thus obtaining N volume values V1, V2, . . . VN with VN=Vtot.

Figure 9:
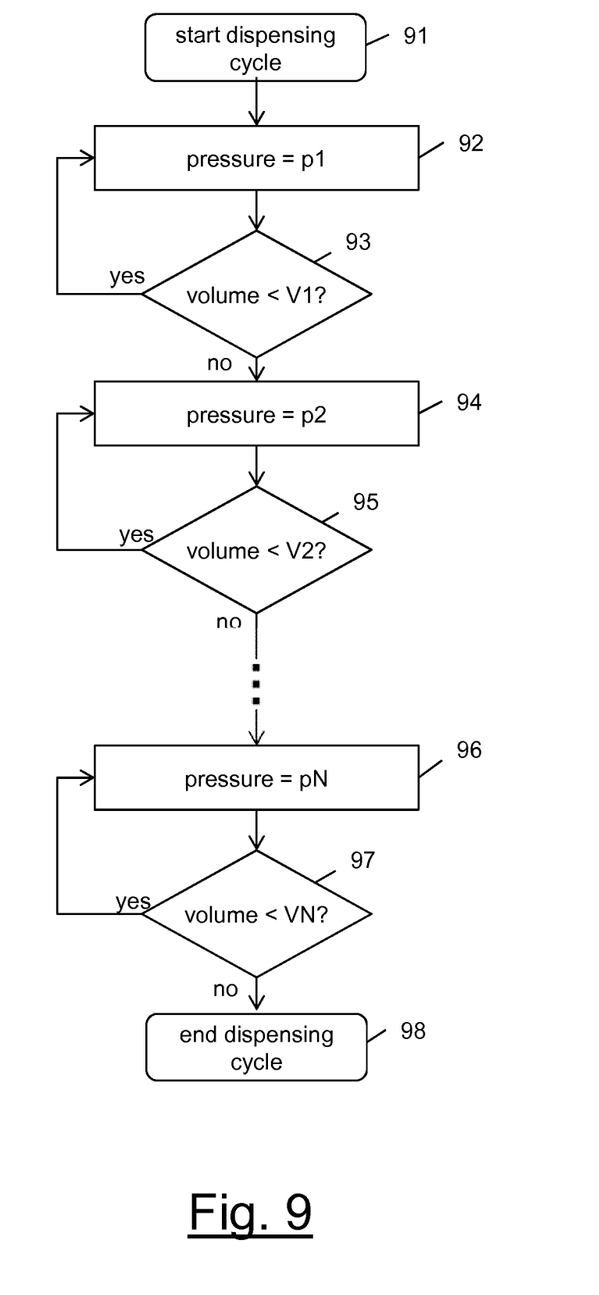
FIG. 9 is a flow diagram of operation of the espresso coffee machine according to a second operating mode.

Operation of the control unit 30 during a dispensing cycle according to the second operating mode is illustrated in FIG. 9.

When the dispensing cycle starts (step 91), the control unit 30 preferably controls dispensing so that the dispensing pressure is equal to the pressure value p1 corresponding to the first volume value V1 (step 92). For this purpose, the control unit 30 preferably receives periodically (for example every 0.1 s) the value of the volume of water supplied to the dispensing group as measured by the flowmeter 16.

At the same time, the control unit 30 receives periodically also the value of the dispensing pressure measured by the pressure sensor 24. In particular, the control unit 30 preferably requests the pressure sensor 24 to detect the dispensing pressure and to supply it with said pressure whenever there is an increase in the volume of water by a predetermined amount, for example 0.5 ml. Then, by means of a feedback mechanism, the control unit 30 preferably adjusts the flowrate of the water supplied to the dispensing group (for example by regulating the electrovalve 9 or directly the flowrate of the pump 10) so as to keep the dispensing pressure at the pressure value p1.

For as long as, on the basis of the volume values received, the control unit 30 determines that the volume of water supplied to the dispensing group is less than the first volume value V1 (step 93), the control unit 30 preferably keeps the dispensing pressure at the pressure value p1.

When instead it determines that the volume of water supplied to the dispensing unit has reached the first volume value V1, the control unit 30 preferably controls the dispensing so as to raise the dispensing pressure from the pressure value p1 to the pressure value p2 corresponding to the second volume value M2 (step 94). In this case also, the control unit 30 preferably acts in such a way that the dispensing pressure passes from p1 to p2 and remains always equal to this latter value using a feedback mechanism similar to that described above.

For as long as, on the basis of the volume values received from the flowmeter 16, the control unit 30 determines that the volume of water supplied to the dispensing group is less than the second volume value V2 (step 95), the control unit 30 preferably keeps the dispensing pressure at the pressure value p2.

The operation of the control unit 30 is repeated cyclically until the control unit 30 adjusts the dispensing pressure to the pressure value pN corresponding to the last volume value VN (step 96). The control unit 30 preferably keeps the dispensing pressure at the pressure value pN until, on the basis of the volume values received from the flowmeter 16, it determines that the volume of water supplied to the dispensing group has reached the last volume value VN (step 97) which, as mentioned above, is equal to the desired total volume Vtot.

When Vtot is reached, the control unit 30 then automatically ends the dispensing cycle (step 98).

At the end of the dispensing cycle, therefore, the bartender has obtained the desired dispensed liquid volume Vtot as the sum of the volumes V1, V2, . . . VN, each of which was dispensed with the respective dispensing pressure p1, p2, . . . pN determined on the basis of the desired pressure profile.

If the bartender wishes to vary the total volume Vtot, this variation will result in rescaling of the values of the samples v1, v2, . . . vN according to a different scale factor, something which will advantageously allow, by means of execution of the algorithm according to FIG. 9, the same pressure profile to be reproduced and, at the end of the dispensing cycle, a new desired total volume value Vtot to be obtained.

Therefore, according to this second operating mode also, a high degree of reproducibility of the dispensing parameters is obtained, something which, in combination with the possibility of choosing the desired pressure profile, allows the bartender to obtain in a precise and repeatable manner beverages with the desired organoleptic properties.

The invention claimed is:

1. An espresso coffee machine comprising a dispensing group configured to dispense a shot of espresso coffee, the dispensing group being configured to removably engage a portafilter, the machine comprising:

a pump configured to provide pressurized water to the dispending group;

a pressure sensor positioned at the dispensing group and configured to measure values of a dispensing pressure at the dispensing group;

a weighing device configured to measure values of a mass of liquid at an outlet of the dispensing group; and a control unit configured to receive the values of the dispensing pressure and the values of the mass of liquid, wherein the control unit is configured to control, using the values of the dispensing pressure and the values of the mass of liquid, the dispensing pressure according to a profile of dispensing pressure as a function of the mass of liquid, wherein the control unit operates by feedback to adjust flowrate of the pressurized water supplied to the dispensing group by regulating the flowrate of the pump.

2. The expresso coffee machine according to claim 1, wherein the control unit, given a total amount of liquid (Mtot) to be supplied at the outlet of the dispensing group during a dispensing cycle, is configured to:

subdivide the total amount of liquid (Mtot) into N portions (M1, M2, . . . MN); and during the dispensing of each of the N portions (M1, M2, . . . MN), keep the dispensing pressure at a first respective substantially constant value (p1, p2, . . . PN), said respective substantially constant value being determined on the basis of the profile of dispensing pressure as a function of the mass of liquid.

3. The expresso coffee machine according to claim 2, wherein the control unit, during said dispensing cycle, is configured to:

periodically obtain the values of mass of liquid at the outlet of the dispensing group and when, on the basis of the periodically obtained values of liquid mass, the control unit determines that the dispensing of one of said N portions has terminated, change the dispensing pressure from the respective first substantially constant value (p1, p2, . . . PN) to a further substantially constant value (p1, p2, . . . PN) associated with a respective next portion.

4. The expresso coffee machine according to claim 2, wherein the control unit is configured to:

periodically obtain the dispensing pressure values from the pressure sensor; and by the feedback to adjust the flowrate of the water supplied to the dispensing group so as to keep the dispensing pressure at the substantially constant value.

5. The expresso coffee machine according to claim 1, wherein the control unit is provided with a memory configured to store the profile of dispensing pressure as a function of the mass of liquid.

6. The expresso coffee machine according to claim 5, comprising data entry means for loading into the memory the profile of dispensing pressure as a function of the amount of liquid, wherein the data entry means comprise a data input/output interface.

7. The expresso coffee machine according to claim 5, wherein the memory stores the profile in the form of a discrete set of N samples ((m1; p1), . . . (mN; pN)), with N being greater than or equal to 2, wherein each sample ((m1, p1), . . . (mN, pN)) comprises a respective sample of mass of liquid (m1, . . . mN) and a respective pressure value (p1, . . . pN) associated with the sample of mass of liquid according to the profile of dispensing pressure as a function of the mass of liquid.

8. The espresso coffee machine according to claim 1, wherein the pump comprises a gear pump.

9. The espresso coffee machine according to claim 1, wherein the gear pump is upstream from the portafilter.

10. A method for adjusting a dispensing pressure of an espresso coffee machine comprising: a dispensing group configured to dispense a shot of espresso coffee, the dispensing group being configured to removably engage a portafilter, and a pump configured to provide pressurized water to the dispensing group, the method comprising:

measuring values of a dispensing pressure at the dispensing group;

measuring values of a mass of liquid at an outlet of the dispensing group and controlling, using the values of dispensing pressure and the values of mass of liquid, the dispensing pressure according to a profile of dispensing pressure as a function of mass of liquid, wherein the controlling is carried out by feedback wherein the flowrate of the water supplied to the dispensing group is regulated by adjusting the flowrate of the pump.

11. The method according to claim 10, further comprising storing in a memory the profile of dispensing pressure as a function of the mass of liquid.

12. The method according to claim 11, further comprising using a data input/output interface to load into the memory the profile of dispensing pressure as a function of the amount of liquid, wherein the data entry means comprise a data input/output interface.

13. The expresso coffee machine according to claim 11, wherein the memory stores the profile in the form of a discrete set of N samples ((m1; p1), . . . (mN; pN)), with N being greater than or equal to 2, wherein each sample ((m1, p1), . . . (mN, pN)) comprises a respective sample of mass of liquid (m1, . . . mN) and a respective pressure value (p1, . . . pN) associated with the sample of mass of liquid according to the profile of dispensing pressure as a function of the mass of liquid.

14. The method according to claim 10, wherein the pump comprises a gear pump.

15. The method according to claim 10, wherein the gear pump is upstream from the portafilter.

\* \* \* \* \*